July 20, 1943.  H. McCARTHY ET AL  2,324,633
LOCKING DEVICE
Filed April 30, 1942
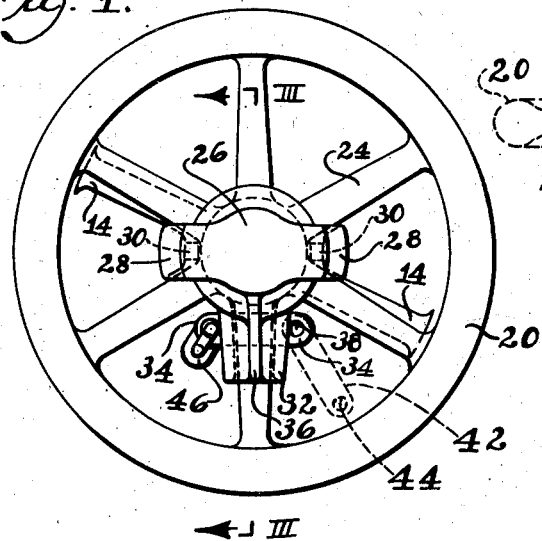
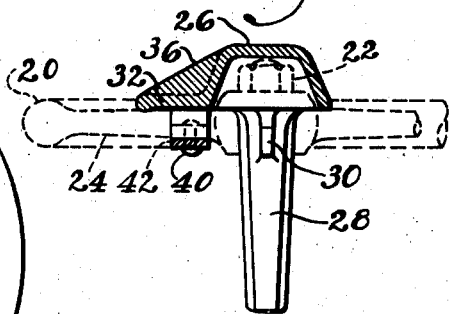
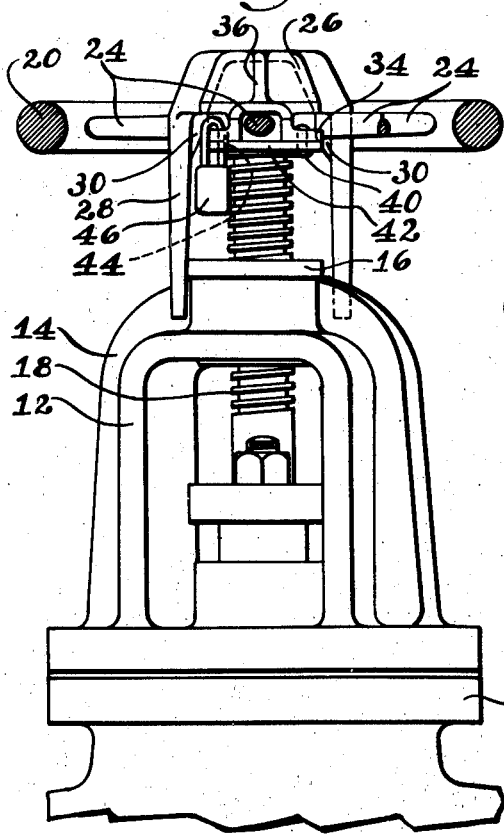
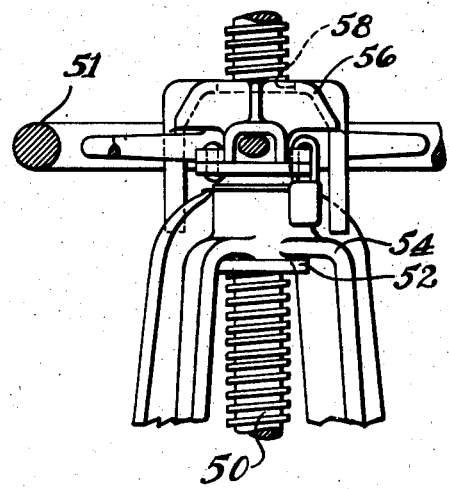
INVENTOR.
HARRY McCARTHY, &
JESSE R. BRASEL.
BY
Albert J. Henderson
ATTORNEY.

Patented July 20, 1943

2,324,633

UNITED STATES PATENT OFFICE 2,324,633

LOCKING DEVICE

Harry McCarthy and Jesse R. Brasel, Kewanee, Ill., assignors to Walworth Patents Inc., Boston, Mass., a corporation of Massachusetts Application April 30, 1942, Serial No. 441,124

2 Claims. (Cl. 70—180)

This invention relates to locking devices and more particularly to locking devices for valves and other handwheel operated mechanisms.

The device of this invention is of the same general type as that disclosed in Patent No. 1,986,128 and may be used for similar purposes. However, a greater measure of security against unauthorized operation of the locked mechanism is afforded by reason of improved means for attaching the locking device in position. While the prior devices are capable of securely locking certain types of handwheel operated mechanisms, they are subject to removal by unauthorized manipulation from similar types to which they can be applied. These devices are thus restricted to a relatively minor field of usefulness and their use on mechanisms slightly different to those for which they are particularly suited may lead to false assumptions of security if unauthorized removal is possible.

Hence, in addition to the general objects enumerated in the foregoing patent an object of this invention is to extend the field of usefulness of such locking devices by guarding against unauthorized removal from the mechanism to which the device is applied.

Another object of the invention is to obtain the added advantages without rendering the device more difficult to use and without departing from simplicity and economy in manufacture.

Other objects and advantages will become apparent from the following description taken in connection with the accompanying drawing wherein:

Fig. 1 is a plan view of a valve superstructure having the locking device applied thereto.

Fig. 2 is an elevation of the same, but showing the valve handwheel in section.

Fig. 3 is a section taken on the line III—III of Fig. 1 and

Fig. 4 is an elevation, partly in section, of the handwheel and associated parts of a valve showing a modified form of the device applied thereto.

Referring more particularly to the drawing, the valve illustrated in part in Figs. 1 to 3 is of the rising stem type and may be either of the globe, gate or similar conventional types. The valve structure shown comprises a body 10 having a yoke 12 secured thereto and provided with upstanding ribs 14. The yoke 12 carries the usual yoke nut 16 within which a threaded valve stem 18 is adapted to rotate. A handwheel 20 is secured against rotation relative to the valve stem 18 beyond the yoke 14 by means of the nut 22 and is provided with a plurality of spaced arms 24 radiating from the axial portion thereof. The handwheel 20, as well as the other parts described, are of conventional form in gate and globe valve construction and further description of such valves is deemed unnecessary to an understanding of the disclosure of this invention.

The locking device of this invention may be formed of cast metal and consists of a unitary structure which may readily be applied to valves of the type described. The device shown in Figs. 1 to 3 comprises a dome-shaped hub portion 26 which may be positioned coaxially on the handwheel 20, the annular edge of the hub portion being seated upon the arms 24, and the dome-shaped construction providing an enclosure for the nut 22. Located at diametrically opposite points on the hub portion 26 are integral leg portions 28 which extend between adjacent arms 24 of the handwheel 20 into engagement with the upstanding ribs 14 of the yoke 12.

It will be observed that when opposite arms 24 of the handwheel 20 are positioned slightly offset from alignment with the yoke 12 that the leg portions 28 will extend on opposite sides of the upstanding ribs 14 and will serve to interconnect the handwheel 20 with the yoke and thus prevent relative rotation. In the drawing, the handwheel 20 is shown locked with the valve open so that clockwise rotation to closed position is prevented. If the valve were locked closed then the leg portions 28 would be placed on the opposite sides of the ribs 14 from that shown to prevent counterclockwise rotation to open position. Such directions of rotation are customary, but may be reversed without altering the utility of this invention. The legs 28 are of sufficient length to engage the ribs 14 as shown in Fig. 2 when the valve is open and may engage the sides of the yoke 12 when the valve is closed. Preferably the legs 28 are wedge-shaped in cross-section and are provided with narrow ribs 30 on their inner faces which extend into proximate relation with the axial portion of the handwheel 20. The wedge-shaped section permits close engagement between the legs and handwheel arms for securing the handwheel against rotation tending to move the valve.

A locking flange 32 projects from the hub portion 26 intermediate the diametrically opposite leg portions 28 and thus overlies one of the arms 24 of the handwheel 20. The locking flange 32 is channel-shaped in cross-section and is provided with semicircular lugs 34 on the opposite sides thereof which project into the space on either side of the arm 24 which the locking flange 32 overlies. The locking flange 32 thus substantially encloses the arm 24 of the handwheel on three sides thereof and may extend approximately halfway along the length of the arm. A rib 36 may extend from the outer end of the locking flange 32 to the hub portion 26 to provide added strength to the casting.

The lugs 34 are provided with openings 38, one of which is adapted to receive a rivet or pin 40 for pivotally mounting a hasp 42 thereon. The hasp 42 is in the form of a rectangular plate having both ends rounded to conform to the shape of the lugs 34 and extends from one lug to the other across the underside of the arm 24 when in position. At the opposite end from the pivot 40 the hasp 42 is provided with an opening 44 adapted to register with the opening 38 in the related lug 34 when the hasp is moved into position across the underside of the arm 24 on the handwheel. When the locking device is thus installed a padlock 46 may be secured in position through the aligned openings 44 and 38 to retain the locking device against withdrawal from the handwheel.

The locking device of this invention may be applied to the handwheel to lock the valve in any desired position between open and closed. Due to the unavoidable lost motion which occurs when the handwheel initially is operated to move the valve member, the positioning of the handwheel in the described relation to the yoke can readily be accomplished. The pivoted arrangement of the hasp 42 permits this member to be located in the position shown in dotted lines in Fig. 1 when the locking device is applied to the handwheel and then moved laterally to bring the opening 44 therein into registry with the opening 38 in the lug of the locking flange 32.

The use of the device described and shown herein is not limited to valves of the rising stem type. It will be apparent that a non-rising stem valve could be locked in either open or closed position also. In Fig. 4 is illustrated a slightly modified form applied to a valve having a rising stem 50 which reciprocates relative to the handwheel 51. The stem 50 is rotatable in a yoke nut 52 carried by the yoke 54 and the handwheel 51 is carried by the nut 52. In this modified form the hub portion 56 of the locking device is made slightly larger in diameter and of less height than that of the form previously disclosed and is provided with a perforation 58 through which the stem 50 may project. As the remaining parts of the structure may be identical with those described in connection with the locking device for non-rising stem valves, further description is deemed unnecessary. A locking device of the type shown in Fig. 4 will likewise prevent operation of the valve from any position wherein it is locked regardless of whether this position is open, closed, or one intermediate thereto.

The invention has been described in detail with respect to valve construction but it will be understood that its use is not limited to such mechanisms but is applicable to many others operated by a handwheel having spaced arms adjacent a relatively stationary portion of the mechanism. Accordingly various modifications and rearrangements of parts will be apparent to those skilled in the art and are contemplated as being within the scope of this invention as defined in the appended claims.

We claim:

1. A locking device for use on mechanisms operated by a handwheel having spaced arms adjacent a relatively stationary portion of the mechanism, said device comprising a hub portion engageable with one side of the arms, a leg portion projecting from said hub between adjacent arms and engageable with the stationary portion to restrain movement of the handwheel, a locking flange carried by said hub and engageable with at least one other of the arms on the side engageable by said hub, and means pivoted on said flange for insertion between arms adjacent said flange and being adapted for movement laterally thereof into operative engagement with said one other arm on another side thereof, said flange and pivoted means having openings adapted to register upon said operative engagement to receive locking means preventing unauthorized withdrawal of the device from the handwheel.

2. A locking device for valves provided with a handwheel having spaced arms for rotating a valve stem supported in a yoke, said device comprising a hub portion seating on the arms adjacent the valve stem and having an opening receiving the end of the stem, diametrically opposite leg portions projecting from said hub portion for depending between adjacent arms and being engageable with opposite sides of the yoke to restrain rotation of the handwheel, a locking flange extending from said hub portion intermediate said leg portions and overlying one other of the arms, oppositely disposed lugs carried by said flange and located on either side of said one other arm, and a hasp pivotally mounted on one of said lugs for insertion between arms adjacent said flange and being movable laterally of said flange into operative engagement with said one other arm on the side opposite said flange, said hasp and one of said lugs being provided with openings adapted to register upon said operative engagement to receive locking means preventing unauthorized withdrawal of the device from the handwheel.

HARRY McCARTHY.
JESSE R. BRASEL.